United States Patent  [15] 3,650,088
Wilson  [45] Mar. 21, 1972

[54] SEALING METHOD AND APPARATUS
[72] Inventor: Donald C. Wilson, San Jose, Calif.
[73] Assignee: FMC Corporation, San Jose, Calif.
[22] Filed: Sept. 23, 1969
[21] Appl. No.: 860,335

[52] U.S. Cl. ..................................53/127, 53/89, 53/167, 53/373, 156/381
[51] Int. Cl. ..................................B65b 7/06, B65b 55/06
[58] Field of Search ..................53/86, 89, 112 B, 127, 167, 53/373; 156/381, 382, 494, 538

[56] References Cited

UNITED STATES PATENTS

| | | | |
|---|---|---|---|
| 2,277,288 | 3/1942 | Berch | 53/373 X |
| 2,441,940 | 5/1948 | Rohdin | 53/373 X |
| 3,182,432 | 5/1965 | Canfield | 53/373 X |
| 3,230,687 | 1/1966 | Nutting et al. | 53/28 X |
| 3,430,414 | 3/1969 | Ludwig et al. | 53/112 B X |
| 3,488,914 | 1/1970 | Csernak | 53/373 X |

Primary Examiner—Robert L. Spruill
Attorney—F. W. Anderson and C. E. Tripp

[57] ABSTRACT

A high-dwell, high pressure, and low temperature method and apparatus for sealing heat sealable flexible containers. The flexible containers are sealed before moving out of a sterilizing chamber maintained at a sterilizing temperature of between about 212° and 250° F. Sealing bars are heated to a temperature of between about 250° and 300° F., and are clamped against the container at a pressure above 100 p.s.i., preferably about 250 p.s.i. for a period of between 2 to 6 seconds, preferably about 4 seconds.

11 Claims, 17 Drawing Figures

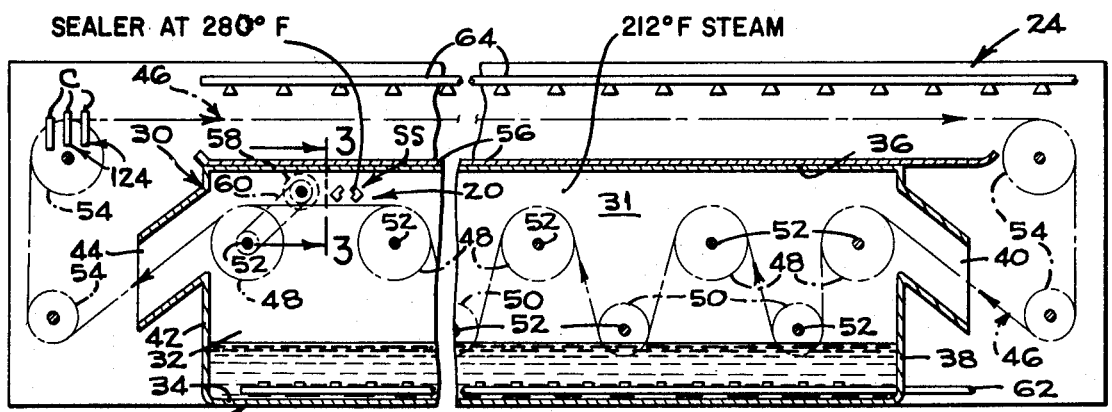

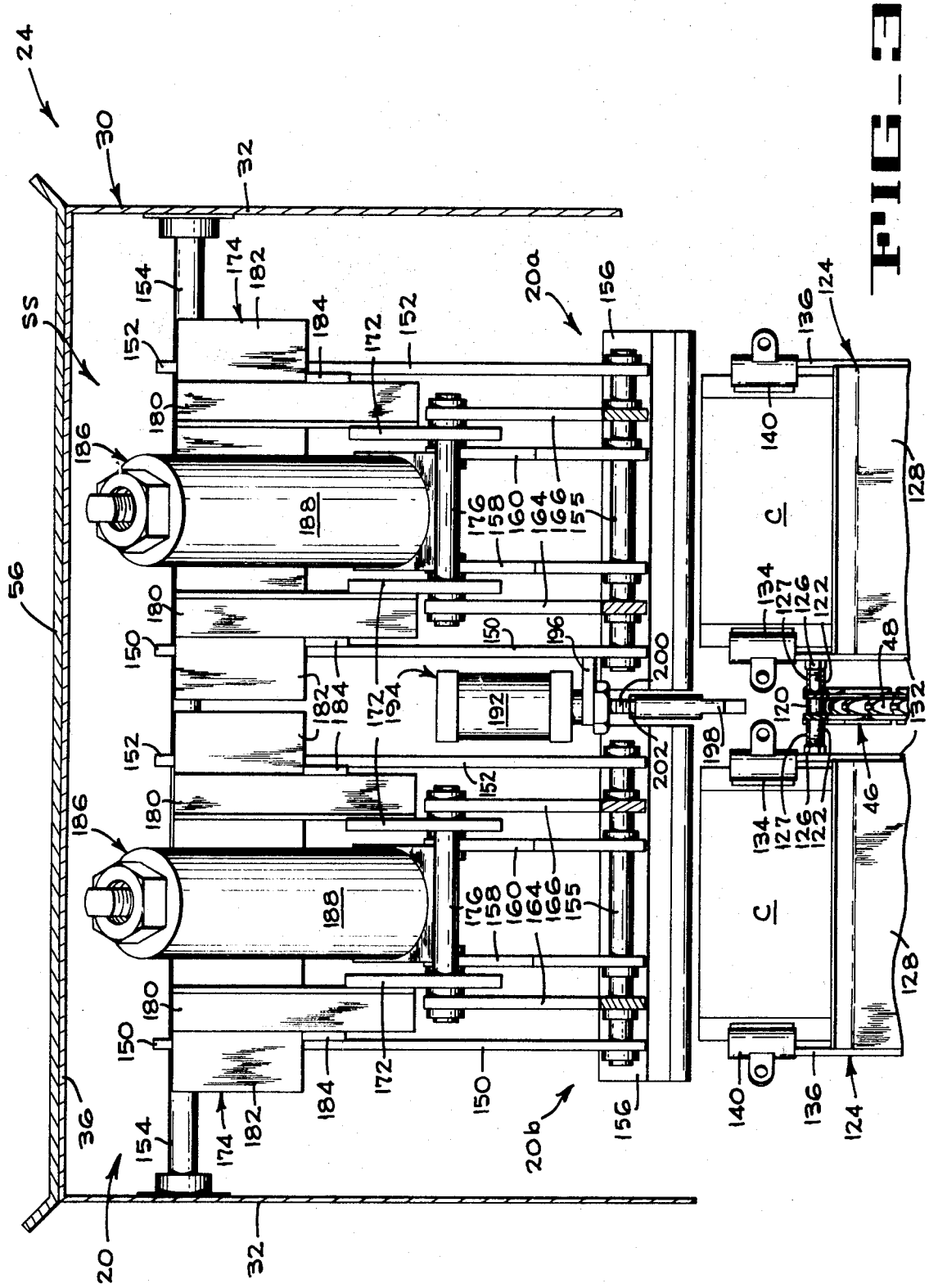

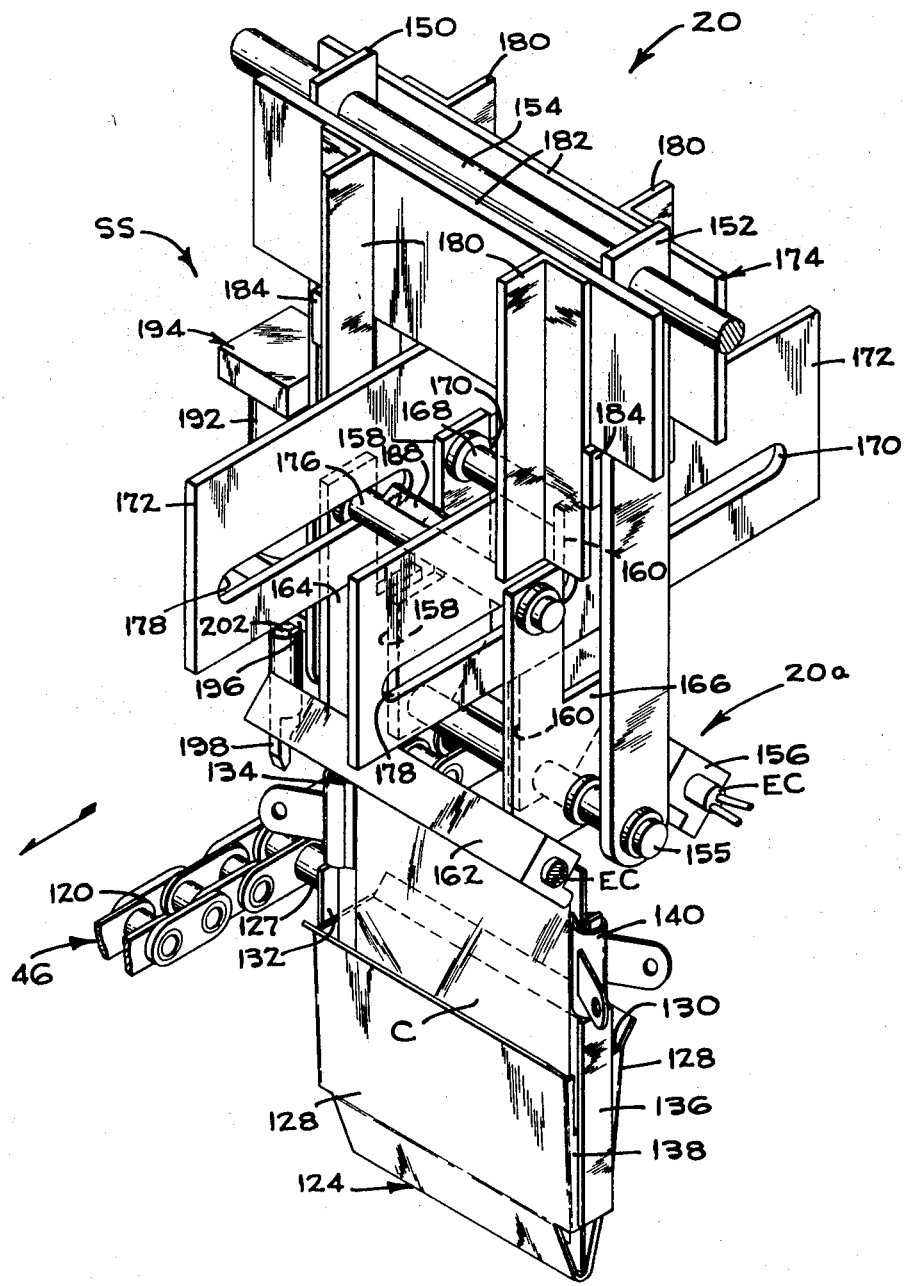
FIG_4

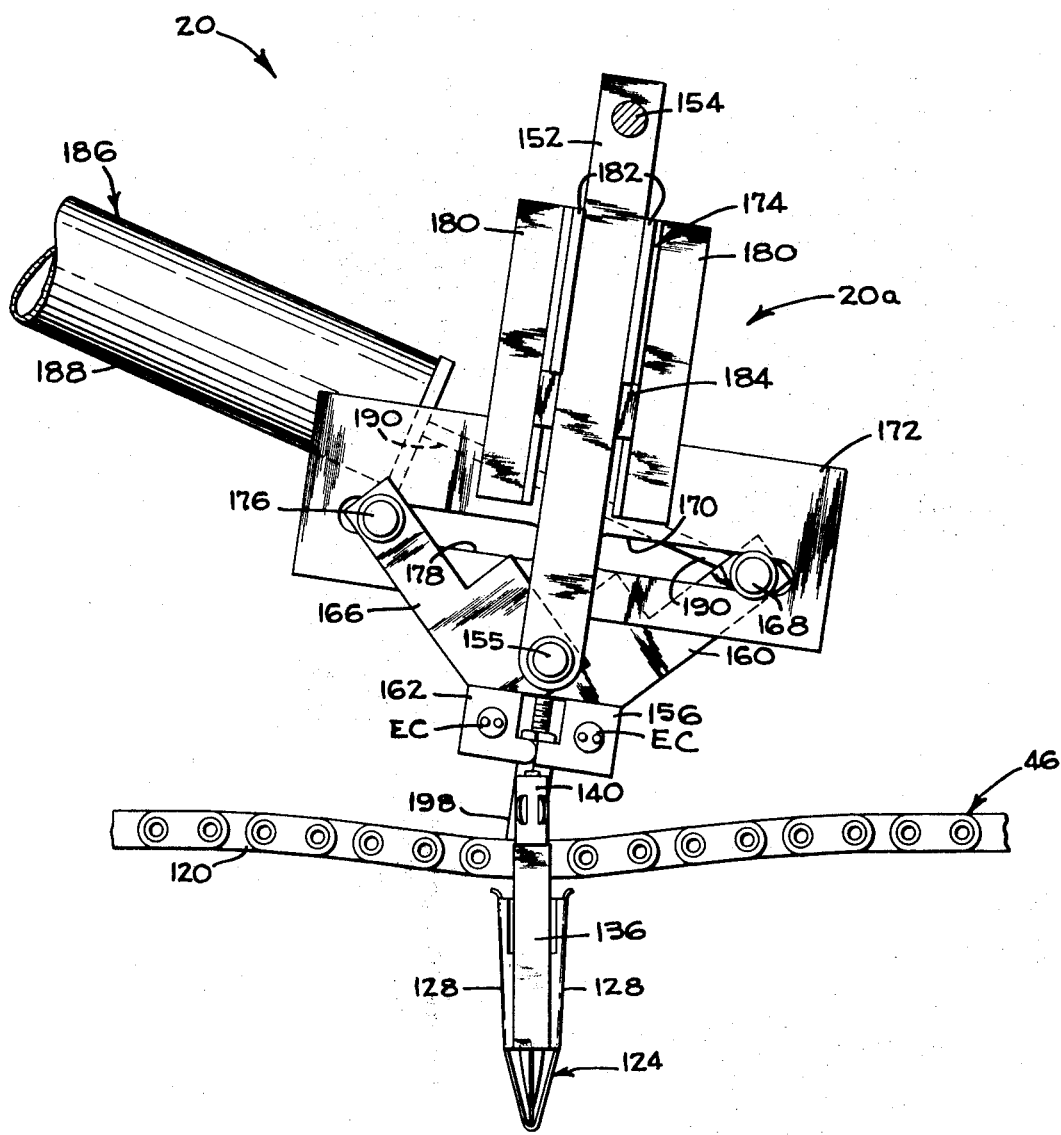
FIG_4A
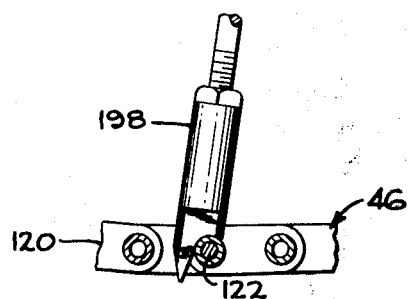
FIG_4B

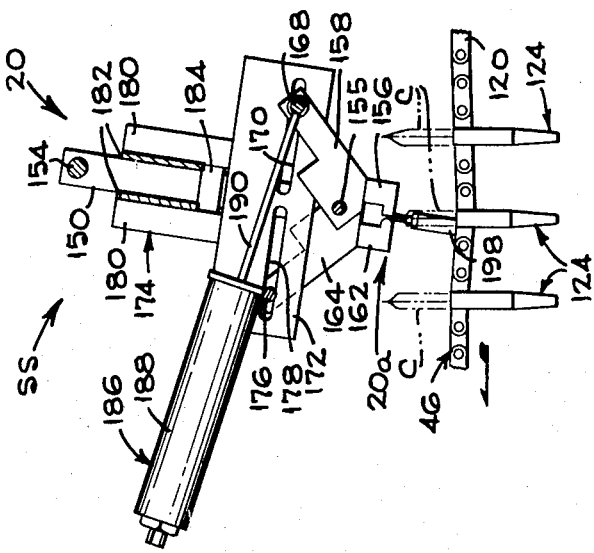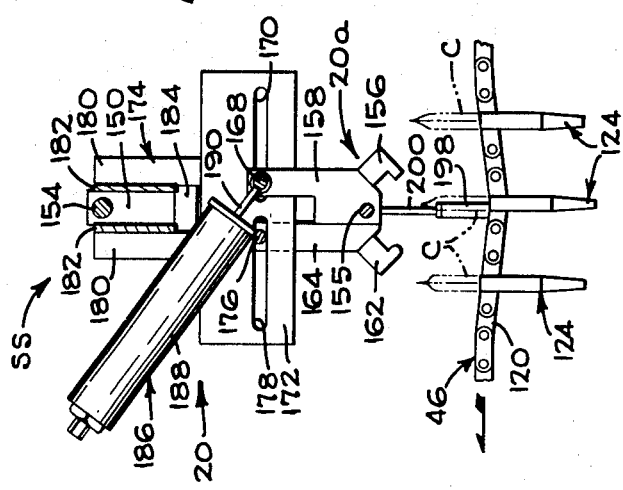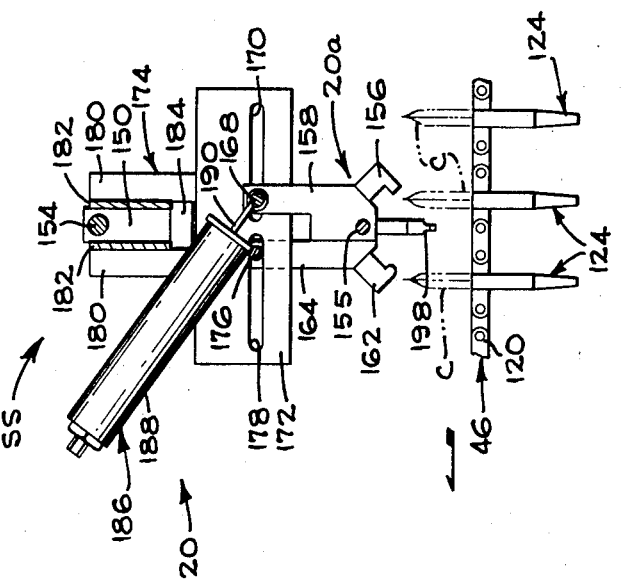

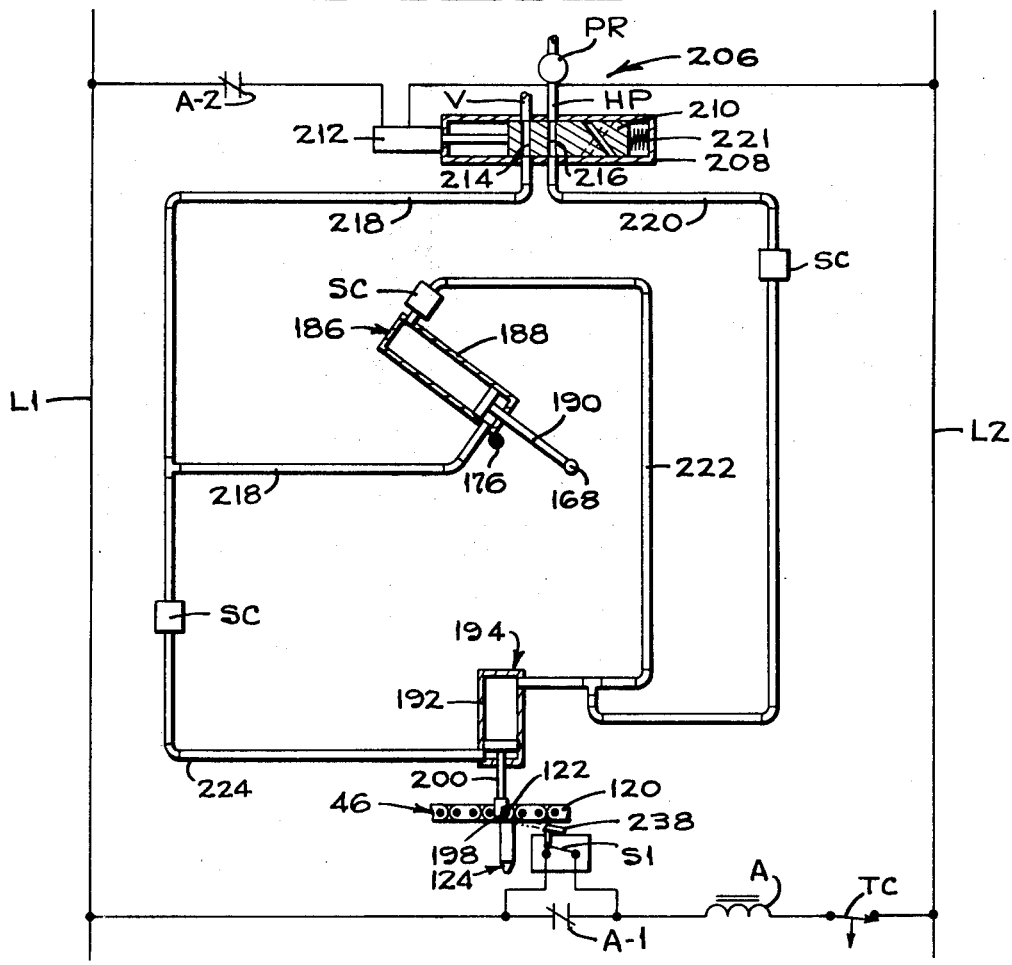
FIG_8
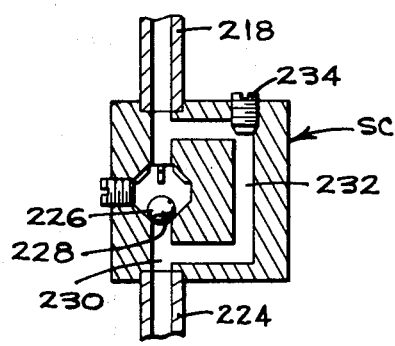
FIG_8A

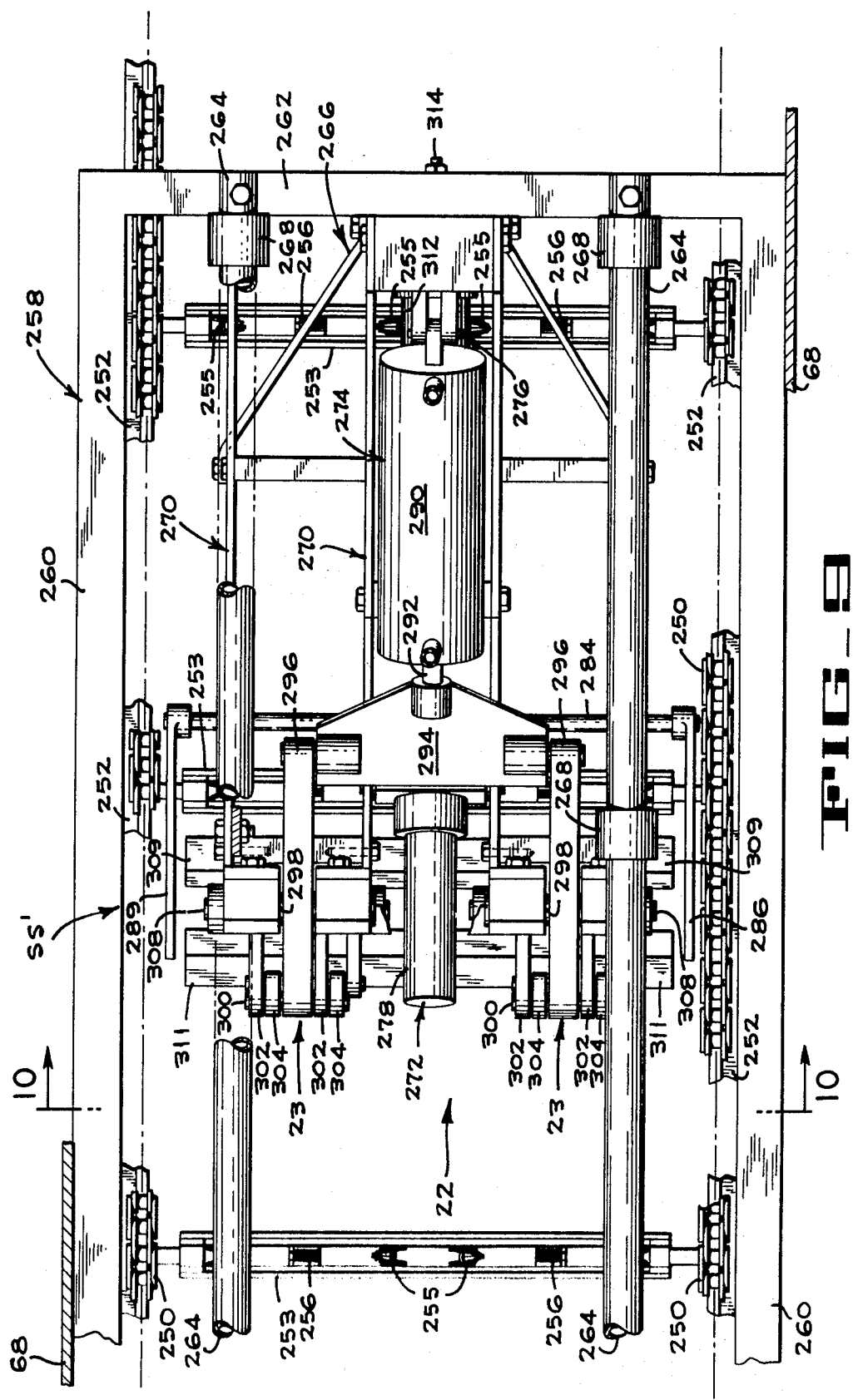

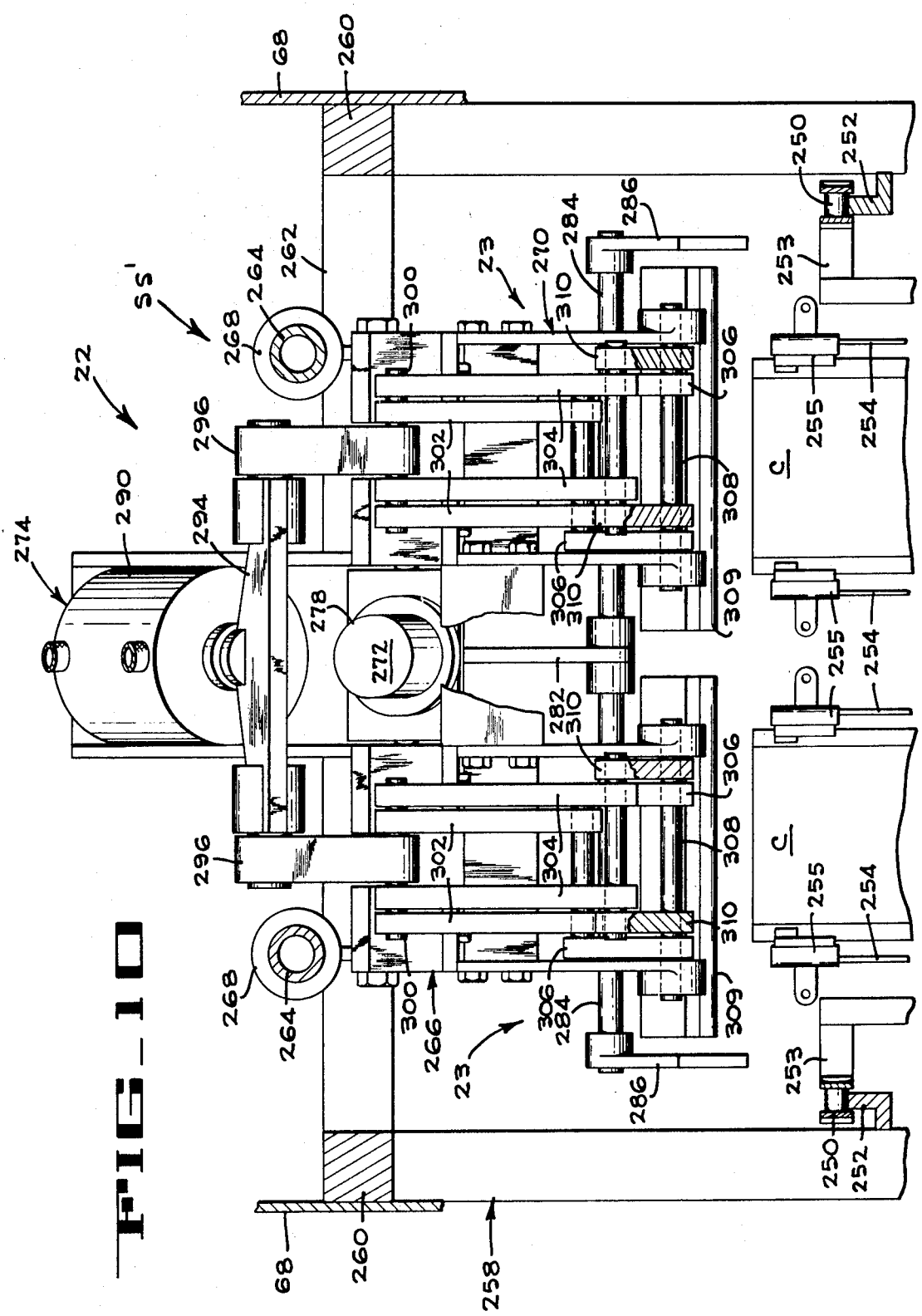

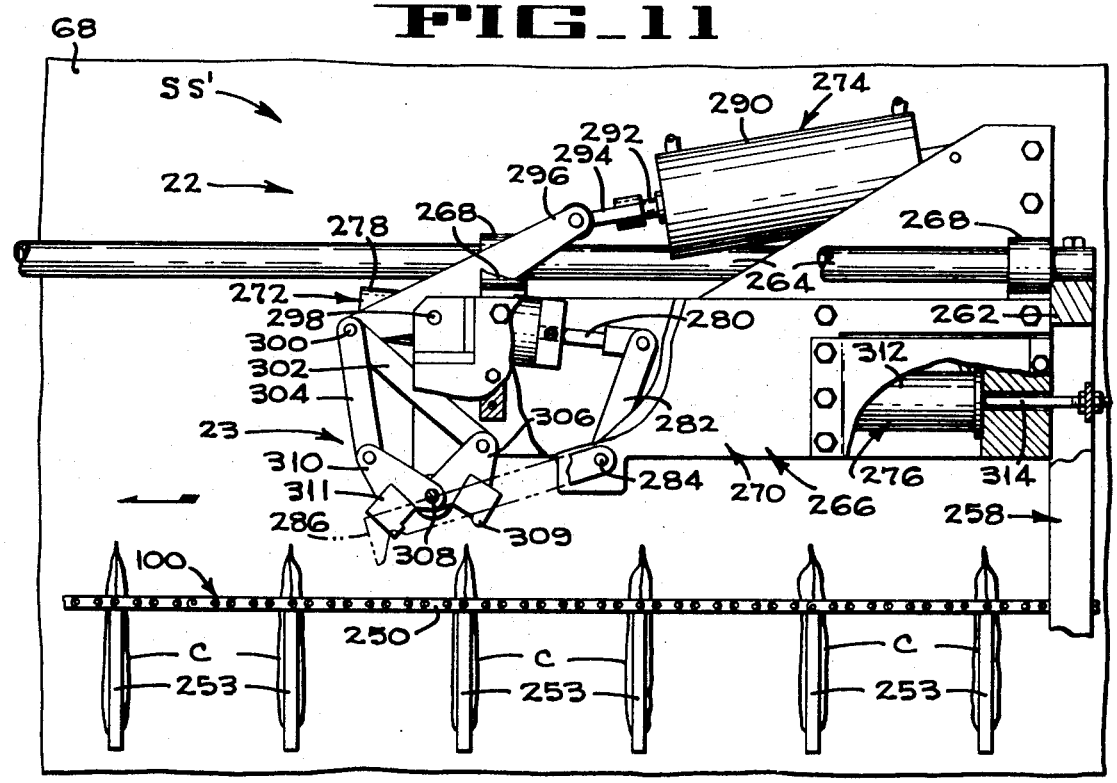
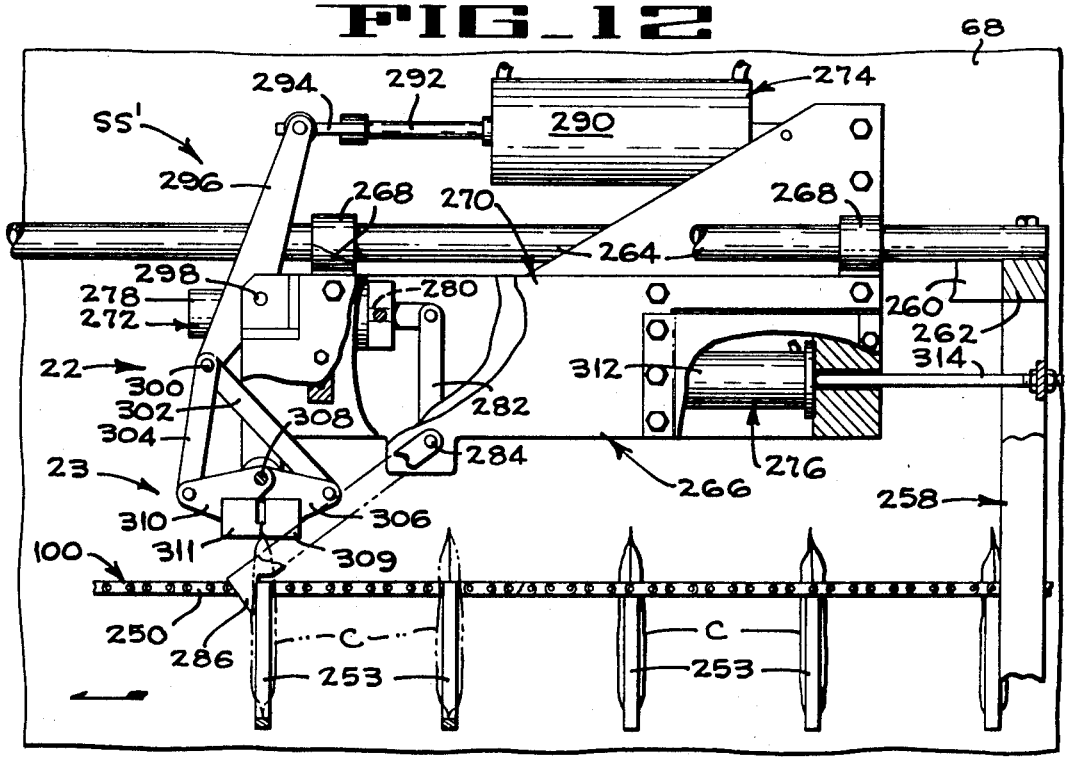

3,650,088

SEALING METHOD AND APPARATUS

CROSS REFERENCE TO RELATED APPLICATIONS

The sealing method and apparatus of the present invention may be used in the type of apparatus disclosed in my copending application Ser. Nos. 693,330 and 772,321, which applications issued as U.S. Pat. Nos. 3,501,318 and 3,528,826, respectively, and are assigned to the assignee of the present invention.

BACKGROUND OF THE INVENTION

1. Field of the Invention

The present invention pertains to the art of sealing containers which include abutting surfaces of thermoplastic materials which are sealed together by application of heat and pressure, and more particularly relates to a high-dwell, high pressure and low temperature method of sealing thermoplastic flexible containers or pouches.

2. Description of Prior Art

Heat sealable containers such as flexible containers, also referred to as pouches, having sealing surfaces of thermoplastic material are usually sealed when at or below room temperature by sealing bars which subject the container walls to a high temperature of between about 450° to 600° F. at a low pressure of about 40 p.s.i. and for a short time of about 0.5 second or less. When sealing flexible pouches in accordance with this conventional method, the high temperatures necessarily require low pressures to prevent excessive flow of sealing material. The low sealing pressure is usually inadequate to remove contamination, such as food particles, from the area being sealed, which contamination absorbs the sealing heat from the sealing material thus resulting in a poor seal. It is also recognized that high temperatures may, under certain conditions cause undesirable chemical reactions to take place with the materials of the laminated pouch.

SUMMARY OF THE INVENTION

In accordance with the sealing method and apparatus of the present invention the containers are sealed while in the sterilizing chamber immediately before the hot containers are conveyed out of the sterilizing chamber. If the sterilizer is an atmospheric sterilizer the entire container and food product therein is heated to about 212° F. and the sealing bars are heated to about 280° F. thus requiring that only about 68° F. be added to the container sealing surfaces to heat these surfaces to the desired sealing temperature within a period of about 4 seconds when subjected to a sealing pressure of about 200 p.s.i. Similarly, when the sterilizer is a superatmospheric sterilizer and the sterilizing temperature is 250° F., sealing bars which are heated to about 280° F. and are subjected to about 200 p.s.i. for a period of 4 seconds would raise the temperature of the sealing surface sufficient to hermetically seal the container. Under these conditions it is noted that the sealing bars need be heated only about 30° F. higher than the sterilizing temperature.

It has been discovered that the contamination problem is greatly reduced when sealing flexible containers in accordance with the present invention. Since the containers and food particles are at the sterilizing temperature immediately prior to the engagement of the container walls by the sealing bars, any food particles remaining in the sealing area are at the sterilizing temperature and accordingly are softened and do not draw excessive amounts of heat from the sealant in the sealing area. Since the low temperature permits the use of high sealing pressures without danger of extruding the sealant from the seal area, this high sealing pressure extrudes the contaminates from the sealing area before the temperature of the sealant has reached the sealing temperature.

Because of the long dwell during sealing and because the containers are moving continuously during sealing, the sealing apparatus of the present invention is arranged to reciprocate with the containers so as to move at the same speed and in the same direction as the containers during the sealing operation and move in an opposite direction when returning to engage and seal the next following container.

BRIEF DESCRIPTION OF THE DRAWINGS

FIG. 1 is a diagrammatic central vertical section of an atmospheric cooker and cooler within which the container sealing apparatus of the present invention is positioned.

FIG. 2 is a diagrammatic central vertical section of a high pressure cooker and cooler within which the container sealing apparatus of the present invention is positioned.

FIG. 3 is an enlarged vertical section taken along lines 3—3 of FIG. 1 illustrating the sealing bars associated with a two-row atmospheric sterilizer, one sealing bar being removed so as to more clearly illustrate the linkages.

FIG. 4 is a perspective view of one of the sealing heads showing the head in an open position ready to engage a flexible container supported in a carrier, a pneumatic power unit being removed to better illustrate the linkages of the sealing head.

FIG. 4A is a side elevation of the sealing head of FIG. 4 shown in sealing engagement with a flexible container immediately prior to the completion of the sealing operation.

FIG. 4B is an enlarged section showing a locking finger engaged with the container transport conveyor.

FIG. 5 is a diagrammatic operational view illustrating one of the sealing heads in a retracted open position disengaged from the conveyor, the container clamps of the carrier being omitted for clarity.

FIG. 6 is an operational view similar to FIG. 5 illustrating the sealing head in a retracted open position but engaged with the conveyor and aligned with a flexible container to be sealed.

FIG. 7 is an operational view similar to FIG. 5 illustrating the sealing head in an active sealing position near the end of its sealing operation.

FIG. 8 is a diagrammatic pneumatic and electrical diagram illustrating the control circuit for the first embodiment of the invention.

FIG. 8A is a diagrammatic vertical section taken through a speed control valve.

FIG. 9 is an enlarged horizontal section taken substantially along lines 9—9 of FIG. 2 illustrating a second embodiment of the sealing head of the present invention, certain parts being cut away.

FIG. 10 is a vertical section taken substantially along lines 10—10 of FIG. 9, one sealing bar being removed so as to more clearly illustrate the linkages.

FIG. 11 is an operational view illustrating the sealing head in an inactive rearward position.

FIG. 12 is an operational view similar to FIG. 10 but illustrating the sealing head in a forward sealing position and in engagement with the conveyor.

DESCRIPTION OF PREFERRED EMBODIMENT

Figure 13:
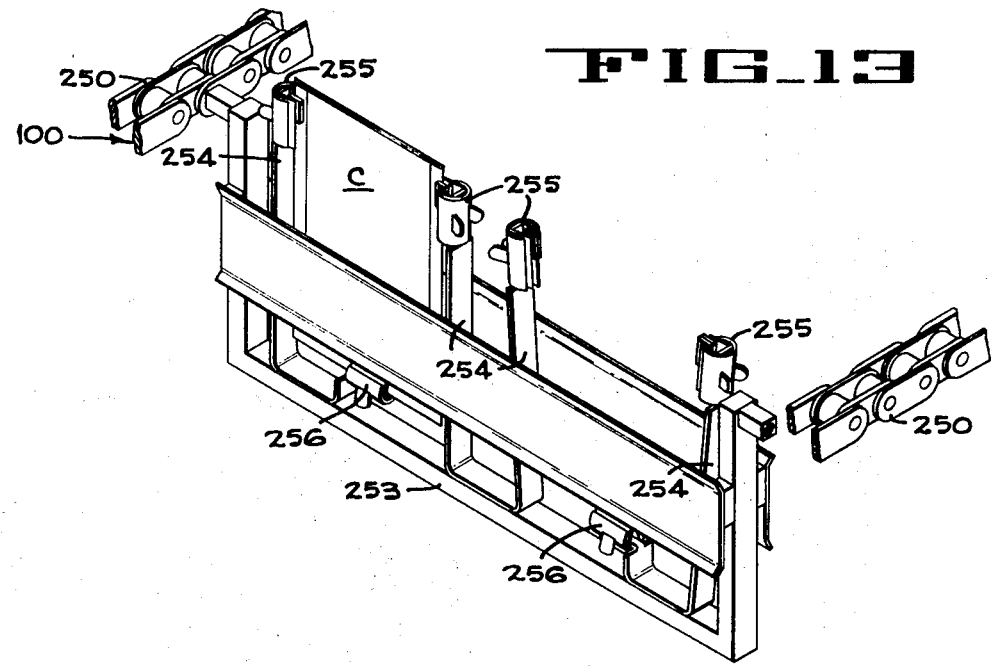
FIG. 13 is a perspective view of one of the carriers associated with the second embodiment of the invention.

The sealing head 20 (FIGS. 3 to 7) of the first embodiment of the invention or the sealing head 22 (FIGS. 8 to 11) of the second embodiment of the invention may be placed either in an atmospheric cooker and cooler 24 (FIG. 1) at a sealing station SS or may be employed in a superatmospheric cooker and cooler 26 (FIG. 2) at a sealing station SS'. Since the sealing heads of either the first or second embodiment of the invention may be used with either the atmospheric cooker and cooler 24 or with the superatmospheric cooker and cooler 26, the cookers and coolers will first be briefly described and thereafter the two embodiments of the sealing heads will be described.

The atmospheric cooker and cooler 24 (FIG. 1) comprises a housing 30 which defines a sterilizing chamber 31 having vertical side walls 32 (only one being shown in FIG. 1), a floor 34, a roof 36, a first end wall 38 having a downwardly inclined inlet tunnel 40 therein, and a second end wall 42 having a downwardly inclined discharge tunnel 44 therein. An endless conveyor 46 is trained along a vertical zigzag path through the housing 30 by upper sprockets 48 and lower sprockets 50 secured to shafts 52 journaled in the side walls 32. The conveyor 46 is also trained around outer sprockets 54 which guide a return run of the conveyor over the housing 30 and over a cooling trough 56. The conveyor is driven by motor 58 and a chain drive 60 that is connected to one of the shafts 52.

The conveyor 46 advances rows of flexible containers C through the sterilizing chamber along a zigzag path so that the containers alternately dip into water in the lower portion of the housing, which water is heated to about 212° F. by steam from a conduit 62, and through steam at about 212° F. in the upper portion of the housing. As described in my aforementioned copending applications, when each container is supported so as to provide a one-way valve in its open end, the alternate movement through steam and hot water in the sterilizing chamber 31 causes air and cooking gases to be purged from the container and also sterilizes the food product within the containers. The sterilized containers are then moved into the sealing section SS in the upper portion of the sterilizing chamber 31 and are sealed while at the sterilizing temperature either by the sealing head of the first embodiment of the invention or the head of the second embodiment of the invention. The containers are then cooled as they pass under cold water sprays emitted from a cooling conduit 64 and are subsequently removed from the conveyor and are replaced by other filled containers to be sterilized.

The superatmospheric cooker and cooler 26 (FIG. 2) is in the form of a hydrostatic cooker. The cooker and cooler 26 includes a housing 66 which comprises a pair of spaced vertical support walls 68 (only one wall being shown in FIG. 2) that are supported in spaced parallel relationship. A sterilizing housing 70 that extends between the two walls 68 has a roof 72 and two depending walls 73 and 74 which cooperate with the two walls 68 to define a cooking or sterilizing chamber 76 which is filled with steam at a predetermined cooking pressure and temperature, for example, at about 250° F. and 15 p.s.i gauge. The lower end of the housing 70 opens into a water filled trough 78 which is formed by the two walls 68, a transverse horizontal floor plate 80 and the lower end portions of two transverse vertical walls 82 and 84. The wall 82 cooperates with another transverse vertical wall 86 to define an inlet hydrostatic water leg 88, and a wall 84 cooperates with a transverse vertical wall 90 to provide an outlet hydrostatic leg 92. The hydrostatic legs 88 and 92 communicate with the trough 78 and are filled with water from conduits 94 so as to create sufficient pressure to resist the pressure of steam in the sterilizing chamber 76. Steam is directed into the sterilizing chamber 76 through a manifold 96 and a valved conduit 98.

The inlet hydrostatic leg 88 is thermostatically controlled to provide a temperature of about 210° F. from the upper end to the lower end of the leg 88. The outlet water leg 92 is also thermostatically controlled and has cooling water added thereto to provide a decreasing water temperature which cools the contents of the containers to a temperature below the boiling point of water at atmospheric pressure. Steam is added to the water in the hydrostatic inlet leg to provide the desired heating temperature therein, and cooling water as mentioned above is directed into the cooling leg 92 to provide the desired cooling temperature therein.

A processing conveyor 100 is trained around a plurality of sprockets 102 and associated guide tracks (not shown in FIG. 2) and is driven by a motor 104 and chain drives 106, 108 and 110 so as to move the conveyor downwardly into the inlet hydrostatic leg 88, through a vertical zigzag path in the sterilizing chamber 76, past the sealing station SS' in the sterilizing chamber at which time the containers are sealed, through the outlet leg 92, and back to the inlet leg 88.

For convenience of description, the sealing head 20 of the first embodiment of the invention will be described in conjunction with the atmospheric cooker and cooler 24, and the sealing head 22 of the second embodiment of the invention will be described in conjunction with the superatmospheric cooker and cooler 26.

The sealing method and apparatus of the present invention has been operated successfully to seal the following types of triple layer laminated pouches:

POUCHES 5" × 7"

| Type | Outer Layer | Middle Layer | Inner Layer | Preferred Sealing Temperatures |
|---|---|---|---|---|
| C-79 Continental Can Co. | 0.5 mil Polyester | 0.35 mil Aluminum Foil | 2.5 mil White opaque polyolifin with filler | 280° F. |
| Dow | 0.5 mil Polyester | 0.35 mil Aluminum Foil | 3.5 mil high density polyethylene | 275° F. |
| Dow | 0.5 mil Polyester | 0.35 mil Aluminum Foil | 2.0 mil medium density polyethylene | 260° F. |
| Reynolds | 0.5 mil Polyester | 0.35 mil Aluminum Foil | 3.0 mil softened polypropylene | 285° F. |

It will also be understood that the sealing method and apparatus is operable with other types of laminated materials, and further be understood that the sealing temperature increases as the thickness of the inner layer increases. If aluminum foil is not present in the laminated pouch, the sealing temperature is lowered.

The sealing head or apparatus 20 (FIGS. 3 to 7) is designed to handle two rows of containers C with the rows being disposed on opposite sides of a single endless hollow pin chain 120 of the conveyor 46. The chain 120 has a plurality of carrier supporting rods 122 pivotally supported thereon at spaced intervals therealong, which rods project equal distance outwardly from both sides of the chain. A carrier 124 is supported on each end of the rod 122, and the carrier is held in place by a locknut 126 and cooperating spacers 127 between the chain 46 and rod 122. As best shown in FIG. 4, each carrier includes side walls 128 which are formed into a generally V-shaped pocket 130 within which a container C is manually placed. An inner wall 132 is pivotally connected to one end of the associated rod 122 as above described at a point slightly above the side walls 128 and extends upwardly from the pivot point to a position adjacent the upper end of the container. A spring loaded clamp 134 is secured to the upper end of the inner wall 132 and is clamped to one edge of the container. A leaf spring 136 is bolted to the outer wall 138 of each carrier 124 and has a clamp 140 secured to its upper end. The clamps 134 and 140 are secured to opposite edges of the flexible container near its upper end and the leaf spring 136 urges the clamp 140 away from the clamp 134 to apply a tensioning force across the mouth of the container. As described in detail in my aforementioned copending applications, this tensioning force forms a one-way valve in the mouth of the container thereby allowing air and cooking gases to be purged from the container preventing flow of gases or liquids into the container.

Two sealing heads 20a and 20b (FIG. 3), one for each row of containers, are provided and each head includes a pair of spaced support arms 150 and 152 which are rigidly secured to a shaft 154 that is journaled in the side walls 32 of the housing 30 at the sealing station SS. Since the two heads are identical only one head will be described in detail.

The head 20a (FIGS. 3 to 7) includes the spaced arms 150 and 152 which have a pivot shaft 155 secured to their lower ends. A front sealing bar 156 is secured to two lever arms 158 and 160 that are journaled on the shaft 155 and extend upwardly therefrom. Similarly, a rear sealing bar 162 is secured to two lever arms 164 and 166 that are journaled on the shaft 155 and extend upwardly therefrom.

The upper ends of levers 158 and 160 are connected by a shaft 168 which extends through horizontal slots 170 into spaced cam plates 172 that form a part of a vertically reciprocable carriage 174. The upper ends of the levers 164 and 166 likewise are connected together by a shaft 176 which extends through horizontal slots 178 in the two cam plates 172. It will be apparent that as the front sealing bar 156 and rear sealing bar 162 pivot about the shaft 155 from the open or inactive position shown in FIG. 6 to the sealing position shown in FIG. 7, the engagement between the shafts 168 and 176 and their associated slots 170 and 178 will cause the carriage to lower.

As best shown in FIGS. 4 and 4A, the carriage 174 includes the cam plates 172 which are welded to angle bars 180 that are in turn welded to two horizontal slide plates 182 that slidably engage the narrow edges of the spaced support arm 150 and 152. The carriage 174 also includes slide plates 184 that are welded to the associated angle bars 180 and slidably engage the inner flat surfaces of the support arms 150 and 152 and cooperate with the plates 182 to guide the carriage along a path parallel to the arms 150 and 152 during its reciprocable movement.

A power unit which is illustrated in the drawings as a pneumatic ram 186 is provided to move the sealing bars 156 and 162 between their inactive and sealing positions. As best shown in FIGS. 5 to 7, the cylinder 188 of the ram 186 is rigidly secured as by welding to the shaft 176 while its piston rod 190 is pivotally connected to the shaft 168. Since the carriage 174 is guided so as to move only in a direction parallel to the arms 150 and 152, it will be apparent that engagement between the slots 170 and 178 and shaft 168 and 176 will cause the sealing bars 156 and 162 to move equal amounts in opposite directions upon actuation of the pneumatic ram 186.

Since the dwell period during which the sealing jaws are clamped against the container walls is relatively long, i.e., between about 2 to 6 seconds, it is apparent that the jaws must move with the container during the dwell period. In order to move the head with the containers, the cylinder 192 of a pneumatic ram 194 (FIG. 3) is rigidly secured to a tab 196 that is welded to the arm 150. A chain engaging finger 198 is screwed into the piston rod 200 of the ram 194 and is locked in desired position by locknut 202. As best shown in FIG. 5, the lower end of the finger 198 is shaped so as to fit between adjacent pivot pins of the conveyor chain 120 thereby operatively connecting the lower portion of the head to the chain 120 causing the sealing head 20 to pivot about the axis of the shaft 154.

The finger 198 when in its lower chain engaging position causes the chain to bow downwardly a small amount as shown in FIGS. 6 and 7 thereby assuring that the chain will remain in tight engagement with the finger 198 during the entire sealing operation and further assuring that there will be no tendency for the jaws to attempt to lift the container from its carrier because of the arcuate movement of the sealing head 20. It will also be appreciated that the upper portion of the container is somewhat flexible and that the carriers are pivoted to the conveyor chain so that the container and carrier may freely pivot or deflect slightly and remain in substantially radial alignment with the arcuate path of movement of the sealing head 20 during the sealing operation.

A pneumatic and electrical circuit 206 (FIG. 8) is provided to actuate the closing of head 20a in timed relation with the movement of the conveyor 46. As diagrammatically indicated in FIG. 8, air is received from a source of high pressure air and is directed through pressure regulator PR. A conduit HP is connected to a solenoid operated valve 208, and low pressure air is vented through conduit V. The pressure regulator PR is of the well known adjustable type which may be adjusted so as to provide a sealing pressure above 100 p.s.i., preferably about 250 p.s.i. The valve 208 includes a shiftable core 210 which, when the solenoid 212 is energized, aligns parallel passages 214 and 216 with the conduits V and HP, respectively, and also with conduits 218 and 220 respectively. When the solenoid is deenergized a spring 221 moves the core to a cross passage position.

Conduit 220 communicates with the upper end of the cylinder 192 and has a speed control valve SC (FIGS. 8 and 8A) therein. Conduit 220 also communicates with the upper end of the sealing cylinder 188 of a ram 186 through conduit 222 and another speed control valve SC. Conduit 218 is connected directly to the lower end of the cylinder 188 and is also connected to the lower end of the cylinder 192 through conduit 224 which has a speed control valve SC therein.

Each speed control valve SC is oriented as indicated in FIG. 8A so that downward movement of fluid will urge a ball 226 into sealed engagement with a valve port 228 in a main passage 230 thereby causing the fluid to flow through a branch passage 232. A needle valve 234 is provided in the branch passage and may be adjusted to vary the rate of fluid flow therepast. Flow of fluid in the opposite direction, i.e., upwardly as viewed in FIGS. 8 and 8A, will raise the ball 226 from its valve port 228 thus allowing substantially unrestricted free flow of fluid therepast.

As diagrammatically illustrated in FIG. 8, the solenoid 212 of the valve 208 is energized by closing a normally open switch S1 by one of the carrier supporting rods 122 when a carrier is moved into position to be sealed. The switch S1 includes an elongated actuating element 238 which is actuated by the carrier supporting rod 122. The switch S1 is connected in series between main lines L1 and L2 with a relay A of a timer or time delay relay and a closed timer contact TC. Momentary closing of switch S1 energizes the relay A through the closed timer contact TC. Energization of the timer relay A closes relay contact A-1 forming a holding circuit across the switch S1 and also closes relay contact A-2 which closes a circuit to the solenoid 212 of the valve 208 thereby shifting the core 210 to the straight passage position shown in FIG. 8. High pressure air is then directed through lines 220 and 222 to the upper ends of the cylinders 192 and 188 of the rams 194 and 186. The speed control valves SC are regulated so that the ram 194 is actuated prior to actuation of the ram 186 so that the sealing head 20 will be connected to the conveyor chain 122 prior to movement of the sealing bars 156 and 162 into engagement with the container being sealed.

The valve 208 remains in the position described immediately above until the dwell period set on the timer, i.e., between 2 to 6 seconds, elapses at which time the timer contact TC momentarily opens to deenergize the timer relay A thereby opening contacts A-1 and A-2 and deenergizing solenoid 212 returning the core 210 of the valve 208 to the cross-passage position. High pressure air is then directed through lines 218 and 224 to the bottom ends of cylinder 188 and 192 of the rams 186 and 194. The speed control valve SC resists flow of fluid into the ram 194 thereby permitting the sealing bars 156 and 162 to release the container C before the finger 198 is raised from engagement with the conveyor chain 120.

The sealing apparatus 22 (FIGS. 9 to 14) of the second embodiment of the invention will be described in conjunction with the superatmospheric cooker and cooler 26 illustrated in FIG. 2. It is to be understood however that the sealing apparatus 22 may also be used with an atmospheric cooker and cooler of the type disclosed in FIG. 1.

The sealing apparatus 22 as illustrated is associated with a two-row cooker and cooler 26 and includes a sealing head 23 for each row. The processing conveyor 100 includes two spaced endless chains 250 guided through the sealing section SS' by tracks 252 interconnected by a plurality of evenly spaced rigid U-shaped double carriers 253 (FIG. 13) that are pivotally connected to the chains 250. The double carriers 253 include four upstanding spring loaded arms 254 which have spring clips 255 on their upper ends that grip the side edges of the flexible containers C to apply a tensioning force across the mouth of each container to define a one-way valve therein. The carriers also include spring clips 256 which engage the lowered ends of the containers and prevent flotation of the flexible containers as they are being moved through liquid heat treatment mediums within the cooker and cooler 26.

The sealing apparatus 22 comprises a frame 258 having longitudinal members 260 which are rigidly secured to the side walls 68 of the housing 66 near the discharge end of the sterilizing chamber. Two transverse frame members 262 (only one being shown in FIGS. 9 to 12) support a pair of elongated guide rods 264. As best shown in FIGS. 11 and 12, the guide rods 264 slidably support a carriage 266 by means of collars 268 that are secured to a sub-frame 270. The sub-frame carries three power units which are illustrated as pneumatic rams; and indexing ram 272, a sealing ram 274, and a carriage return ram 276.

The indexing ram 272 includes a cylinder 278 that is pivotally mounted on the sub-frame 270 and has its piston rod 280 pivotally connected to a lever 282 that is keyed to a cross shaft 284 pivotally supported by the sub-frame 270. A pair of spaced hooking arms 286 are keyed to the shaft 284 and are movable by the indexing ram 272 between an upper inactive position as shown in FIG. 11 and a lower active position illustrated in FIG. 12. As will be described later, the piston rod is moved to its retracted position when the conveyor has moved a container C into position to be sealed. Retraction of the piston rod 280 causes the hooked ends of arms 286 to engage the associated carrier 253 thus causing the carriage 266 to move with the processing conveyor 100 during the sealing operation from the position shown in FIG. 11 to the position shown in FIG. 12.

The sealing ram 274 includes a cylinder 290 which is pivotally connected to the sub-frame 270 of carriage 266 and also includes a piston rod 292 which is connected to a triangular plate 294 (FIGS. 9 and 10). The plate 294 is pivotally connected to one end of two spaced levers 296 pivoted on the sub-frame 270 by pins 298. Each lever 296 operates one of the two sealing heads 23 which heads are identical and therefore only one head will be described in detail.

The other end of each lever 296 is connected to a pin 300 which is pivotally connected to the upper end of two sets of links 302 and 304. The links 302 are pivotally connected to arms 306 that are pivoted about a pin 308 connected to the sub-frame 270 and have a first sealing bar 309 rigidly secured thereto. Similarly the links 304 are pivotally connected to a pair of arms 310 that are pivoted about the pin 308 and have a second sealing bar 311 rigidly secured therewith. As is well known in the art, at least one of the sealing bars has a generally semicylindrical surface which is heated by an electrical coil EC (FIG. 4) to raise the temperature thereof to the bonding temperature, i.e., between about 250° to 300° F., while the other sealing bar has a hard rubber surface and acts as a pressure resisting member. However, both sealing bars are preferably heated by electrical coils EC, and are held together with a pressure which applies a force to the container being sealed above about 100 p.s.i. and preferably about 250 p.s.i.

The carriage return ram 276 is actuated after the sealing operation has been completed to return the carriage from its extended position shown in FIG. 12 to its retracted position shown in FIG. 11. The ram 276 includes a cylinder 312 which is secured to the carriage 266 and a piston rod 314 which is secured to the stationary frame 258.

Figure 14:
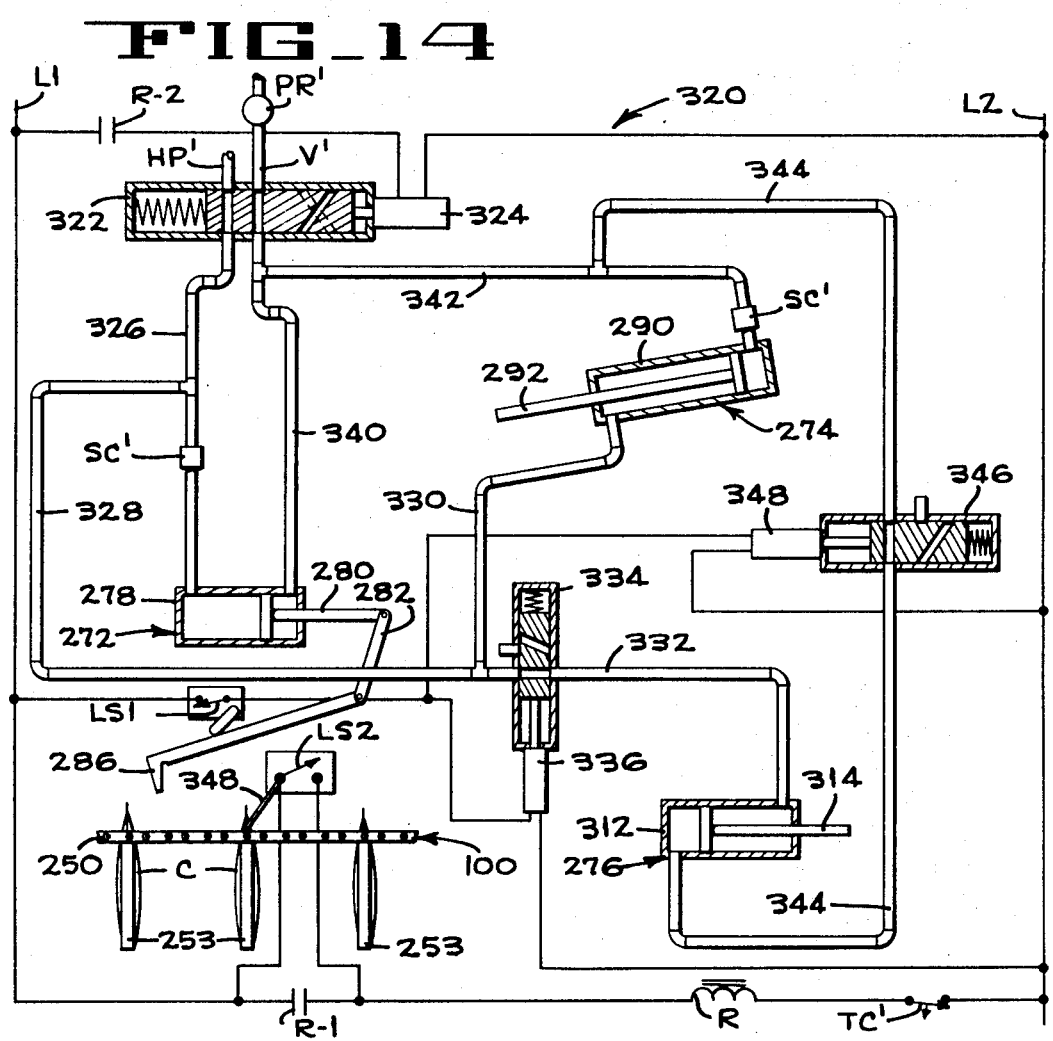
FIG. 14 is a diagrammatic pneumatic and electrical diagram illustrating the control circuit for the second embodiment of the invention.

As diagrammatically illustrated in FIG. 14, the sealing apparatus of the second embodiment of the invention is controlled by pneumatic and electrical circuit 320. The circuit 320 includes a four-way solenoid valve 322 which is shiftable from the illustrated parallel passage position to a cross passage position upon energization of solenoid 324. Prior to movement of the container into position to be sealed, the parts of the apparatus 22 are positioned as shown in FIGS. 11 and 14 and the solenoid 324 is deenergized. When in this position air from a high pressure source is directed into the four-way valve 322 through a pressure regulator PR' and high pressure conduit HP' and air is vented from the valve through conduit V'. The pressure regulator PR' is of the well known adjustable type which may be adjusted so as to provide a sealing pressure above 100 p.s.i., preferably about 250 p.s.i. The high pressure air flows through a parallel passage in the valve 322, through a conduit 326 and speed control valve SC' to the cylinder 278 of the indexing ram 272. High pressure air is directed into the cylinder 290 of the sealing ram 274 through conduits 328 and 330. A conduit 332 having a solenoid valve 334 therein connects the conduit 328 to a cylinder 312 of the carriage return ram 276 to direct high pressure air therein when the solenoid 336 of valve 334 is energized as illustrated. At this time, air is vented from the cylinder 278 of the indexing ram 272 through a conduit 340 which communicates with the vent conduit V' through a parallel passage in the valve 322. The cylinder 290 of the sealing ram 274 is vented through a conduit 342 which is connected between the cylinder 290 and the conduit 340 and has a speed control valve SC' therein. The cylinder 312 of the carriage return ram 276 is vented through a conduit 344 connected between the cylinder 312 and the conduit 342 and has a solenoid valve 346 therein which includes a solenoid 348.

The solenoid valves 334 and 346 each include a core having a straight passage therein which permits fluid to flow through the conduits 332 and 344, respectively, when the valves are energized. The cores of valves 334 and 346 also include slanted passages which when the valves are deenergized serve to bleed fluid from both sides of the cylinder 312 of ram 276 and to prevent high pressure air from entering either side of the cylinder 312.

As illustrated in FIG. 14, both solenoid valves 334 and 346 are energized in response to the closing of a limit switch LS1 which is connected in series between main lines L1 and L2 with solenoids 336 and 348 of solenoid valves 334 and 346. The switch LS1 is closed in response to movement of the holding arms 286 to their inactive upper position as illustrated in FIG. 11, and is opened when the arms move downwardly into engagement with the processing conveyor 100. The solenoid 324 of the four-way valve 322 is energized in response to one of the double carriers 253 contacting an actuating element 348 of a limit switch LS2 thereby momentarily closing the switch. Closing of switch LS2 energizes the relay R of a timer or time delay relay through closed timer contact TC'. Energization of timer relay R closes relay contact R-1 which establishes a holding circuit across switch LS2, and also closes relay contact R-2 which closes a circuit to the solenoid 324 of the four-way valve 322 thereby shifting the valve to the cross-passage position.

In the operation of the sealing apparatus 22 of the second embodiment of the invention, filled but unsealed flexible containers C are manually placed in the double carriers 253 (FIG. 13) and are clamped in position by the clips 255 and 256. The continuously driven conveyor 100 then advances the containers through the preheating liquid in the inlet hydrostatic leg 88 and through the sterilizing medium in the sterilizing chamber 76. Prior to leaving the sterilizing chamber 76, the containers are moved into and through the sealing station SS'.

As the pair of flexible containers C move into position to be sealed, their supporting carrier 253 engages and closes limit switch LS2 thereby energizing the relay R of the timer, closing relay contact R-1 and R-2. Closing of relay contacts R-1 and R-2 causes the energization of solenoid 324 of the four-way valve 322. Energization of the solenoid valve 322 moves the valve core to the cross passage position. High pressure fluid then flows directly into the cylinder 278 of the indexing ram 272 through conduit 340 thereby rapidly moving the hooking arms 286 into engagement with the carriers 253 causing the carriage 266 to move with the conveyor 100. Downward movement of the arms 286 causes the switch LS1 to open thereby simultaneously deenergizing both solenoid valves 334 and 346 causing the slanted passages to register with the conduits 332 and 344 thus bleeding air from both ends of the carriage return cylinder 312 and preventing high pressure fluid from flowing into the cylinder 312. High pressure fluid also flows into the cylinder 290 of the sealing ram 274 but its flow is restricted slightly by the speed control SC' thereby assuring that the carriage 266 is locked in sealing position to the conveyor 100 before the sealing jaws engage the containers.

The valves 322, 334 and 346 remain in the positions described immediately above until the dwell period set on the timer, i.e., between 2 to 6 seconds, elapses at which time the timer switch TC' momentarily opens to deenergize timer relay R thereby opening contacts R-1 and R-2 and deenergizing solenoid 324 of four-way valve 322 returning the valve to the parallel passage position shown in FIG. 14.

High pressure fluid then flows through conduits 326, 328 and 330 to the cylinder 290 of sealing ram 274 thereby rapidly opening the sealing jaws releasing the sealed containers. High pressure fluid also flows through conduit 326 and speed control valve SC' into the cylinder 278 of indexing ram 272. The speed control valve SC' is set to reduce the rate of flow of fluid into the cylinder 278 to assure that the sealing jaws will release the container before the arms 286 are disengaged from the conveyor 100. When the arms 286 move to their uppermost position, the switch LS1 closes thereby energizing both solenoid valves 334 and 346. High pressure fluid then flows through valve 334 and conduit 332 into the cylinder 312 of carriage return ram 276 thereby moving the carriage to its retracted position as illustrated in FIG. 11 thus completing a cycle of operation of the sealing apparatus.

The sterilized and sealed containers are then conveyed out of the cooker through the cooling water in hydrostatic outlet water leg 92 to cool the contents of the containers, and the containers are subsequently removed from their carriers.

In the above description of the apparatus 22 of the second embodiment of the invention it will be understood that the speed control valves SC' are identical to the speed control valves SC of the first embodiment of the invention and that these valves SC' may be adjusted to provide a desired rate of fluid flow therethrough.

It will also be understood that the temperature of the heat treatment medium in the first embodiment of the invention may be slightly below 212° F. if it is desired to pasteurize rather than sterilize the contents of the containers.

From the foregoing description it is apparent that the sealing method and apparatus of the present invention contemplates sealing flexible containers while heated at a temperature equal to or substantially equal to the sterilizing temperature by subjecting the containers to the relatively low temperature of about 250° to 300° F., at a pressure above about 100 p.s.i. and preferably about 250 p.s.i., for a long dwell period of between about 2 to 6 seconds and preferably about 4 seconds.

Although the best mode contemplated for carrying out the present invention has been herein shown and described, it will be apparent that modification and variation may be made without departing from what is regarded to be the subject matter of the invention.

I claim:

1. An apparatus for sealing flexible containers having walls defined by adjacent layers of heat sealable thermoplastic material and having an unsealed mouth, comprising a housing; means for supporting and moving the containers along a predetermined path and through said housing; a sealing head adjacent said path; said sealing head including a pair of sealing bars, means for heating at least one of said sealing bars to a temperature within the range of about 250° to 300° F., power means for moving said bars between an inactive position spaced from each other and an active position clamping the portion of a container to be sealed therebetween with a pressure of above about 100 p.s.i., and control means for maintaining the sealing bars in said active position for a period of between about 2 to 6 seconds, said housing including a sterilizing chamber having a sterilizing medium therein maintained at a sterilizing temperature, and said sealing head being disposed within said sterilizing chamber.

2. An apparatus for sealing flexible containers according to claim 1 wherein said sterilizing temperature is about 212° F.

3. An apparatus for sealing flexible containers according to claim 1 wherein said sterilizing temperature is about 250° F.

4. An apparatus for sealing flexible containers having walls defined by adjacent layers of heat sealable thermoplastic material and having an unsealed mouth, comprising a continuously driven conveyor for supporting and moving the containers along a predetermined path, a sealing head mounted for pivotal movement about a shaft defining a pivot axis spaced from said path, said sealing head including a pair of sealing bars, means for heating said bars to a bonding temperature, first power actuated means carried by said sealing head for connecting said head to said conveyor during the sealing operation and for causing a portion of the conveyor that is connected to said sealing head to move in an arcuate path about said axis during the sealing operation, and second power means connected to said sealing bars for moving said bars between an inactive position spaced from each other and an active position clamping the portion of a container to be sealed therebetween under a pressure sufficient to seal the container, and control means for maintaining the sealing bars in said active position for a period of between about 2 to 6 seconds.

5. An apparatus for sealing flexible containers according to claim 4 wherein said connecting means is in the form of a finger which is urged downwardly into engagement with said conveyor when a container has moved into position to be sealed, said finger being effective to push said conveyor downwardly out of its normal path of travel so that said contacted portion of said conveyor will move through an arcuate path about said axis during the sealing operation.

6. An apparatus for sealing flexible containers according to claim 1 wherein said means for supporting and moving the containers is a continuously driven conveyor, wherein means are provided to connect the sealing head with the conveyor for movement therewith when the sealing bars are in their active sealing positions, and wherein said sealing head is mounted for pivotal movement about a shaft defining an axis spaced a distance greater than the length of the container from said path, and wherein power actuated means is carried by said sealing head for connecting said head to said conveyor during the sealing operation for pivotal movement about said axis.

7. An apparatus for sealing flexible containers having walls defined by adjacent layers of heat sealable thermoplastic material and having an unsealed mouth, comprising a housing; means for supporting and moving the containers along a predetermined path and through said housing; a sealing head adjacent said path; said sealing head including a pair of sealing bars, means for heating at least one of said sealing bars to a temperature within the range of about 250° to 300° F., power means for moving said bars between an inactive position spaced from each other and an active position clamping the portion of a container to be sealed therebetween with a pressure of about 100 p.s.i., and control means for maintaining the sealing bar in said active position for a period of between about 2 to 6 seconds, said means for supporting and moving the containers being a continuously driven conveyor, means provided to connect the sealing head with the conveyor for movement therewith when the sealing bars are in their active sealing position; said sealing head including a pair of spaced downwardly extending arms secured to said shaft, a pivot shaft secured to the lower portions of said arms, a first pair of levers pivotally connected to said pivot shaft, one of said sealing bars secured to the lower end of said first pair of levers, a second pair of levers pivotally connected to said pivot shaft, said other sealing bar secured to the lower ends of said second pair of levers, a cam plate supported and guided by said arms for moving in a path parallel thereto and having first and second symmetrical slots therein, a first shaft connected to the other ends of said first pair of levers and passing through said first slot, and a second shaft connected to the other ends of said second pair of levers and passing through said second slot, said power means connected between said first and said second shafts for moving said sealing bars between said first and said second positions.

8. An apparatus for sealing flexible containers having walls defined by adjacent layers of heat sealable thermoplastic material and having an unsealed mouth, comprising a housing; means for supporting and moving the containers along a predetermined path and through said housing; a sealing head adjacent said path; said sealing head including a pair of sealing bars, means for heating at least one of said sealing bars to a temperature within the range of about 250° to 300° F., power means for moving said bars between an inactive position spaced from each other and an active position clamping the portion of a container to be sealed therebetween with a pressure of about 100 p.s.i., and control means for maintaining the sealing bars in said active position for a period of between about 2 to 6 seconds; said means for supporting and moving the containers being a continuously driven conveyor; and additionally comprising a carriage, said sealing head being mounted on said carriage, hooking means carried by said carriage for connecting the carriage to the conveyor for movement therewith when the sealing bars are in their active sealing positions, first power means for operating said hooking means, second power means carried by said carriage and connected to said sealing bars for moving said sealing bars between the active and the inactive positions, third power means connected between said carriage and said housing for moving the carriage in a direction opposite to the direction of movement of the conveyor after a container has been sealed and the sealing bars have been moved to their inactive positions, and control means for controlling the actuation of said power means in timed relation with the movement of said conveyor.

9. An apparatus for sealing flexible containers according to claim 8 wherein said control means includes means responsive to the release of the hooking means from said conveyor for actuating said third power means for returning the carriage to its starting position.

10. An apparatus for sealing flexible containers according to claim 8 wherein said housing includes a sterilizing chamber having a sterilizing medium therein maintained at a sterilizing temperature, and wherein said carriage and sealing head are disposed in said sterilizing chamber.

11. An apparatus for sealing flexible containers according to claim 10 wherein one of the sealing jaws has a convex container contacting surface which serves to extrude contaminated material out of the seal area before the thermoplastic material becomes tacky.

* * * * *